Dec. 3, 1963

A. W. GREEN 3,113,262

ANALOGUE-TO-DIGITAL TRANSDUCER

Filed Aug. 22, 1960

United States Patent Office 3,113,262
Patented Dec. 3, 1963

3,113,262
ANALOGUE-TO-DIGITAL TRANSDUCER
Albert W. Green, La Puente, Calif., assignor to Fairchild Camera and Instrument Corporation, a corporation of Delaware
Filed Aug. 22, 1960, Ser. No. 51,232
7 Claims. (Cl. 323—75)

This invention relates to analogue-to-digital transducers and particularly to such transducers for deriving from a continuously variable quantity a finite number of output steps or digits.

Electronic computers of both the analogue and digital types have found widespread application in electronic control, guidance, and navigation systems. Frequently, certain sensing devices are most readily adapted to serve as inputs to analogue computers while others are most readily adapted to digital computers. In such case, the over-all system computers then require the conversion of the sensing outputs to the "same language," that is, both analogue outputs or both digital outputs. While such converters have heretofore been proposed, in general they have involved rather complex electronic equipment.

It is an object of the invention, therefore, to provide a new and improved analogue-to-digital transducer for deriving from a continuously variable quantity a finite number of output steps or digits.

It is another object of the invention to provide a new and improved analogue-to-digital transducer of the type described, which obviates the use of complex electronic equipment and, in the preferred embodiment, consists essentially of an assembly of a high resistance-resolution potentiometer with a low resistance-resolution potentiometer.

In accordance with the invention, an analogue-to-digital transducer comprises an elongated first resistance element having a predetermined resistance resolution and a given resistance gradient and an elongated second resistance element having a resistance resolution substantially lower than said predetermined resolution and substantially the same average resistance gradient. A pair of contact elements are disposed individually, correspondingly and simultaneously to traverse the two resistance elements and are connected to individual output terminals and circuit connections are provided connecting the two resistance elements in parallel and connecting opposite common terminals individually to a pair of input terminals.

For a better understanding of the present invention, together with other and further objects thereof, reference is had to the following description taken in connection with the accompanying drawings, and its scope will be pointed out in the appended claims.

Referring now to the drawings:

FIG. 2 is a schematic circuit diagram of an analogue-to-digital transducer embodying a modified form of the invention; while

Figure 1:
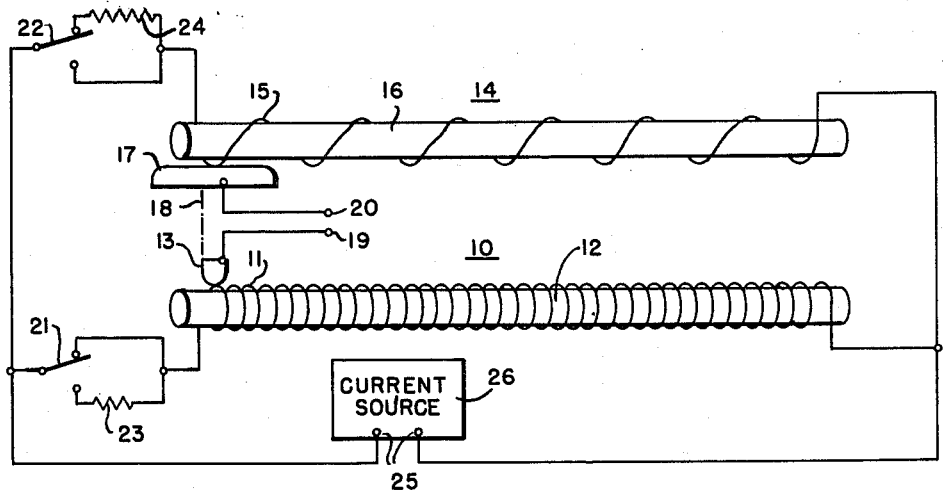
FIG. 1 is a schematic diagram of an analogue-to-digital transducer embodying the invention.

Referring now to FIG. 1 of the drawings, there is represented an analogue-to-digital transducer comprising an elongated wire-wound resistance element 10 having a relatively high resistance resolution and a given resistance gradient. This resistance element comprises a winding 11 disposed on a suitable insulation form 12 and is provided with an adjustable contact 13.

The transducer further includes a second elongated wire-wound resistance element 14 having a relatively low resistance resolution, preferably one that is a minor fraction of that of the resistance element 10, and having substantially the same average resistance gradient as the resistance element 10. The resistance element 14 comprises a winding 15 disposed on an insulation form 16 and provided with an adjustable contact 17 of a width appropriate to traverse the successive turns of the winding 15 without appreciable interruption.

The transducer of the invention further comprises a mechanical connection between the contact elements 13 and 17, as indicated by the dash line 18, the contact elements being disposed individually and simultaneously to traverse their respective resistance elements. The adjustable contacts 13 and 17 are connected to individual output terminals 19 and 20, respectively. They are adapted to be given a movement by the mechanical linkage 18 representative of an analogue quantity.

In order relatively to offset the axes of the characteristics of the resistance elements 10 and 14, as described hereinafter, there is provided a pair of resistance elements 23, 24 adapted to be selectively connected in series with the windings 11, 15, respectively, by means of the two-position switches 21, 22, respectively.

The resistance elements 10 and 14 and their respective series resistors 23 and 24 are connected in parallel, and opposite common terminals are individually connected to a pair of input terminals 25 associated with a suitable current source 26.

Figure 3:
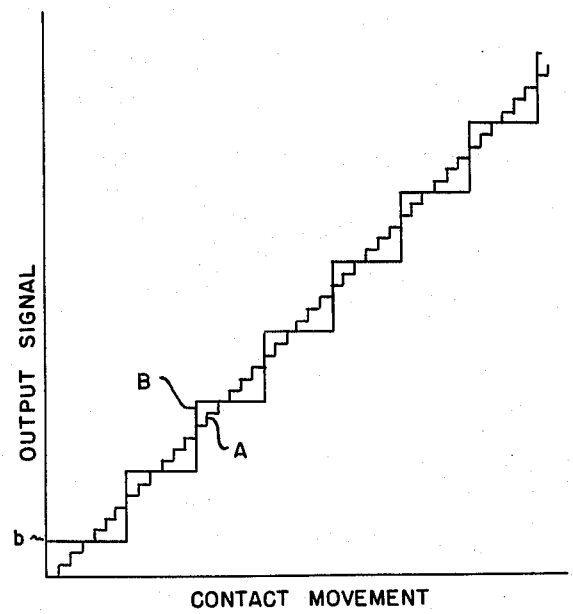
FIGS. 3 and 4 are graphs illustrating certain of the operating characteristics of the transducers of FIGS. 1 and 2 respectively.

The operation of the transducer described may be best illustrated by reference to FIG. 3 of the drawings in which curve A represents the signal appearing at the adjustable contact 13 and curve B represents the signal appearing at the adjustable contact 17, as these contacts are moved to the right to traverse their respective resistance elements. It is noted that curve A starts at the origin, indicating that switch 21 is connected, as illustrated, to exclude the resistor 23 from the circuit. However, curve B has an initial value b, indicating that switch 22 is in the position shown to connect the resistor 24 in series with the winding 15. Therefore, even at the zero position of the contact 17 on the winding 15, there will be a signal at the contact 17 representative of that developed across resistor 24. The signal appearing between the terminals 19 and 20 obviously is the difference between curves A and B which, it will be noted, is generally of pulse wave form, each complete cycle of which corresponds to six steps of curve A. The small steps or ripple of curve A can readily be filtered out so that the difference signal constitutes a series of pulses which are a digital representation of the analogue input to the contacts 13 and 17.

Figure 2:
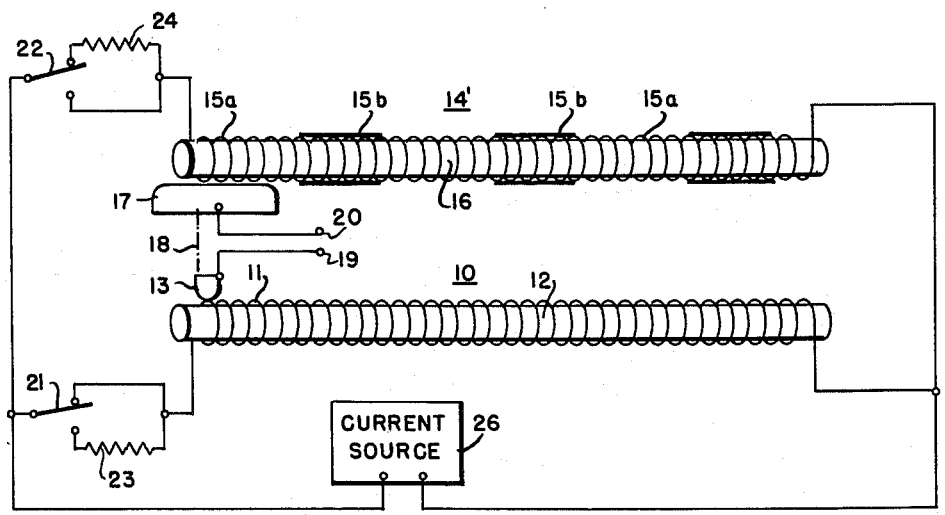

In the modified form of the invention represented in FIG. 2, corresponding elements are given the same reference numerals. In this modification, the resistance element 14 of FIG. 1 is replaced by a resistance element 14' comprising a first group of winding sections 15a, 15a alternating with and serially connected with a second group of sections 15b, 15b, each of the sections 15a, 15a having a resistance gradient substantially higher than that of the resistance element 10 and each of the sections 15b, 15b having a resistance gradient substantially lower than that of the resistance element 10. In the preferred form of the invention illustrated, the group of winding sections 15b, 15b are short-circuited turns having a substantially zero resistance gradient. With this arrangement, the resistance element 14' effectively constitutes a single group of spaced winding sections having a substantially higher resistance gradient than that of resistance element 10, although the average resistance gradient of the groups 15a, 15a and 15b, 15b, taken collectively, is the same as that of the resistance element 10. Expressed in general terms, each of the winding sections 15a, 15a has a resistance gradient $n$ times that of the resistance element 10, where $n$ is any selected value greater than unity, while the combined length of these winding sections is $1/n$ times that of the resistance element 10.

Figure 4:
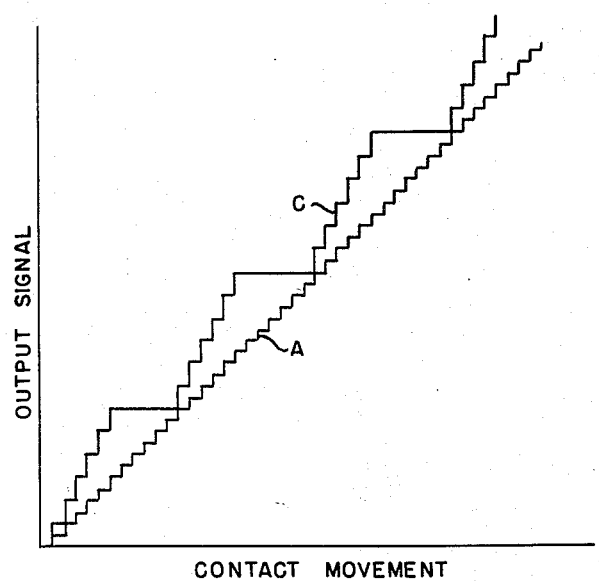

The characteristics of the transducer of FIG. 2 are represented by the graph of FIG. 4, in which curve A, as before, represents the signal appearing at the adjustable contact 13 and its terminal 19 as it traverses the resistance winding 11. Curve C represents the signal appearing at the adjustable contact 17 and the terminal 20 during the same scanning movement. It will be noted that in this graph, both curves A and C commence at the origin, indicating that the switches 21 and 22 are positioned so that both resistors 23 and 24 are excluded from the circuit. As in the embodiment of FIG. 1, the signal appearing between the terminals 19 and 20 is represented by the difference between curves A and C. This, it is seen, is an approximately sawtooth pulse wave having a period twelve times the period of the pulses or steps of curve A. Again, the steps or ripples in curves A and C may be removed by simple filtering so that, as the contacts 13 and 17 are moved in response to the analogue input, a series of definite pulses is developed, constituting a digital representation of the analogue input.

While there have been described what are, at present, considered to be the preferred embodiments of this invention, it will be obvious to those skilled in the art that various changes and modifications may be made therein without departing from the invention and it is, therefore, aimed in the appended claims to cover all such changes and modifications as fall within the true spirit and scope of the invention.

What is claimed is:

1. An analogue-to-digital transducer comprising: an elongated first resistance element having a predetermined resistance resolution and a given resistance gradient; an elongated second resistance element having a resistance resolution substantially lower than said predetermined resolution and substantially the same average resistance gradient; a pair of contact elements disposed individually, correspondingly and simultaneously to traverse said resistance elements and connected to individual output terminals; and circuit connections connecting said resistance elements in parallel and connecting opposite common terminals individually to a pair of input terminals.

2. An analogue-to-digital transducer comprising: an elongated first resistance element having a relatively high resistance resolution and a given resistance gradient; an elongated second resistance element having a resistance resolution which is a minor fraction of that of said first resistance element and substantially the same average resistance gradient; a pair of contact elements disposed individually and simultaneously to traverse said resistance elements and connected to individual output terminals; and circuit connections connecting said resistance elements in parallel and connecting opposite common terminals individually to a pair of input terminals.

3. An analogue-to-digital transducer comprising: an elongated wire-wound first resistance element having a relatively high resistance resolution and a given resistance gradient; an elongated wire-wound second resistance element having a resistance resolution which is a minor fraction of that of said first resistance element and substantially the same average resistance gradient; a pair of contact elements disposed individually and simultaneously to traverse said resistance elements and connected to individual output terminals; and circuit connections connecting said resistance elements in parallel and connecting opposite common terminals individually to a pair of input terminals.

4. An analogue-to-digital transducer comprising: an elongated first resistance element having a relatively high resistance resolution and a given resistance gradient; an elongated second resistance element comprising a group of spaced serially connected sections, each having a resistance gradient substantially higher than that of said first resistance element and said group of sections having an average resistance gradient substantially the same as that of said first resistance element; a pair of contact elements disposed individually and simultaneously to traverse said resistance elements and connected to individual output terminals; and circuit connections connecting said resistance elements in parallel and connecting opposite common terminals individually to a pair of input terminals.

5. An analogue-to-digital transducer comprising: an elongated first resistance element having a relatively high resistance resolution and a given resistance gradient; an elongated second resistance element comprising a group of spaced serially connected sections, each having a resistance gradient $n$ times that of said first resistance element, where $n$ is any selected value greater than 1, the combined length of said sections being $1/n$ times that of said first resistance element; a pair of contact elements disposed individually and simultaneously to traverse said resistance elements and connected to individual output terminals; and circuit connections connecting said resistance elements in parallel and connecting opposite common terminals individually to a pair of input terminals.

6. An analogue-to-digital transducer comprising: an elongated first resistance element having a relatively high resistance resolution and a given resistance gradient; an elongated second resistance element having a relatively low resistance resolution and substantially the same average resistance gradient; a pair of contact elements disposed individually and simultaneously to traverse said resistance elements and connected to individual output terminals; a fixed resistance element; switch means for selectively connecting said fixed resistance element in series with one of said first and second resistance elements; and circuit connections connecting said resistance elements in parallel and connecting opposite common terminals individually to a pair of input terminals.

7. An analogue-to-digital transducer comprising: an elongated first resistance element having a relatively high resistance resolution and a given resistance gradient; an elongated second resistance element comprising a first group of sections alternating with and serially connected with a second group of sections, each of the sections of said first group having a resistance gradient substantially higher than that of said first resistance element and each of the sections of said second group having a resistance gradient substantially lower than that of said first resistance element; a pair of contact elements disposed individually and simultaneously to traverse said resistance elements and connected to individual output terminals; and circuit connections connecting said resistance elements in parallel and connecting opposite common terminals individually to a pair of input terminals.

References Cited in the file of this patent

UNITED STATES PATENTS

| | | |
|---|---|---|
| 2,750,553 | Andersson | June 12, 1956 |
| 3,050,252 | Burhans | Aug. 21, 1962 |

UNITED STATES PATENT OFFICE
CERTIFICATE OF CORRECTION

Patent No. 3,413,262                      November 26, 1968

Arthur C. Hecker et al.

It is certified that error appears in the above identified patent and that said Letters Patent are hereby corrected as shown below:

Column 3, lines 33 to 36, the formulas should appear as shown below:

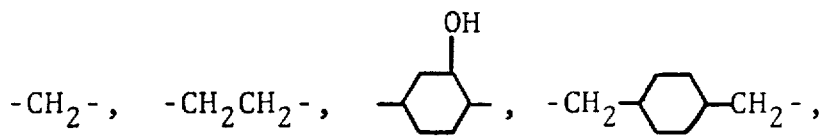

Column 6, line 53, "zenzoic" should read -- benzoic --. Column 7, line 72, "invert" should read -- inert --.

Signed and sealed this 14th day of April 1970.

(SEAL)
Attest:

EDWARD M. FLETCHER, JR.             WILLIAM E. SCHUYLER, JR.
Attesting Officer                   Commissioner of Patents